United States Patent
Schechner

(10) Patent No.: US 10,196,573 B2
(45) Date of Patent: Feb. 5, 2019

(54) TRANSPORTABLE LIQUID PRODUCED FROM NATURAL GAS

(71) Applicant: Pinchas Schechner, Kiriat Bialik (IL)

(72) Inventor: Pinchas Schechner, Kiriat Bialik (IL)

( * ) Notice: Subject to any disclaimer, the term of this patent is extended or adjusted under 35 U.S.C. 154(b) by 17 days.

(21) Appl. No.: 15/501,403

(22) PCT Filed: Aug. 3, 2015

(86) PCT No.: PCT/IL2015/050796
§ 371 (c)(1),
(2) Date: Feb. 2, 2017

(87) PCT Pub. No.: WO2016/027265
PCT Pub. Date: Feb. 25, 2016

(65) Prior Publication Data
US 2017/0226431 A1 Aug. 10, 2017

(30) Foreign Application Priority Data
Aug. 19, 2014 (IL) .......................................... 234196

(51) Int. Cl.
*C10G 50/00* (2006.01)
*B01J 19/12* (2006.01)
*B01J 19/24* (2006.01)

(52) U.S. Cl.
CPC ............ *C10G 50/00* (2013.01); *B01J 19/121* (2013.01); *B01J 19/123* (2013.01); *B01J 19/242* (2013.01); *B01J 19/2475* (2013.01); *B01J 2219/00103* (2013.01); *B01J 2219/00159* (2013.01); *B01J 2219/185* (2013.01); *B01J 2219/187* (2013.01)

(58) Field of Classification Search
CPC ...................................................... C10G 50/00
See application file for complete search history.

(56) References Cited

U.S. PATENT DOCUMENTS

| | | | |
|---|---|---|---|
| 5,328,575 A | 7/1994 | Geiger | |
| 6,156,211 A * | 12/2000 | Gonzalez-Martin | ........................ B01D 53/864 204/157.9 |
| 6,500,313 B2 * | 12/2002 | Sherwood | ................. C07C 2/00 204/157.15 |
| 2005/0045467 A1 * | 3/2005 | Gondal | ................. B01J 19/121 204/157.41 |
| 2005/0189211 A1 | 9/2005 | Morton | |

* cited by examiner

Primary Examiner — Ellen M McAvoy
Assistant Examiner — Ming Cheung Po
(74) Attorney, Agent, or Firm — Law Offices of Steven W. Weinrieb

(57) ABSTRACT

A system and a method for converting Natural Gas (NG) to high energy transportable liquid (such as gasoline) are disclosed. A semiconductor UV-source is used for initiate a photo lytic reaction between methane molecules and photons having energy equal or bigger than the energy of dissociation of the C—H bond in methane. The formed radicals are further react to produce higher molecular weight hydrocarbons, while hydrogen gas is separates from the reaction mixture in order to avoid reverse reactions.

5 Claims, 5 Drawing Sheets

TRANSPORTABLE LIQUID PRODUCED FROM NATURAL GAS

FIELD OF THE INVENTION

The subject matter relates to the use of Natural Gas to synthesize high-energy transportable liquids like gasoline.

BACKGROUND

1.1—Purpose of the Invention

Enormous quantities of Natural Gas, NG, have been found recently. NG is used for electricity generation, in heating (residential and industrial), in the production of chemicals and in transportation.

Despite its abundance and the variety of its uses, the NG has a backdrop: it has a very low energy concentration at ambient temperatures and pressures. The low energy concentration makes difficult to transport the NG from the production field to the processing sites or to the markets. The purposes of the system and method described in the present invention are to enable the production from NG of:
  Gasoline, and/or,
  A high-energy transportable liquid. This liquid will be named "Methanoleum", to emphasize that it is transportable in the same existing transportation infrastructure used to transport petroleum.

1.2—Gasoline

Gasoline is a mixture of alkanes, which has three prominent features:
  As alkanes, they have the general formula $C_nH_{2n+2}$, where n is the number of carbon atoms in the alkane molecule.
  The gasoline mixture contains alkanes with $5 \leq n \leq 10$
  The gasoline alkanes are liquids at temperatures below 20 C at atmospheric pressure.

In the description of the process, the mixture of alkanes linear or branched synthesized in the method of this patent, and having $10 \leq n \leq 5$, will be called "Natural Gas Gasoline", NGG.

The synthetic NGG is not an exact chemical replica of the components of the regular gasoline obtained from petroleum, PG. The NGG will imitate the PG in its behavior in internal combustion engines, in its transportability and its storage.

In Table 1 we find the physical properties of the substances involved in the invention (alkanes and Hydrogen). The Molecular Mass, MM, was calculated using:

$$MM = 14n + 2 \text{ [dalton]} \quad \text{[Eq. 1]}$$

The table includes the boiling point, b.p., only for the linear isomers. The branched isomers have lower b.p. than their correspondent linear isomer. Branched isomers appear also in the PG mixture. They can also be formed during the process described in this patent.

TABLE 1

Physical Properties of Hydrogen and relevant linear alkanes.

| Substance | Formula | b.p. [° C.] of the Linear Isomer | State @25° C., 101.3 kPa | MM [dalton] | Roll in the invention's process |
|---|---|---|---|---|---|
| Hydrogen | $H_2$ | −253 | Gas | 2 | By-product, used in the process |
| Methane | $CH_4$ | −162 | | 16 | Raw Material |
| Ethane | $C_2H_6$ | −89 | | 30 | Intermediate |
| Propane | $C_3H_8$ | −42 | | 44 | product |
| Butane | $C_4H_{10}$ | −0.5 | | 58 | |
| Pentane | $C_5H_{12}$ | 36 | Liquid | 72 | NGG mixture |
| Hexane | $C_6H_{14}$ | 69 | | 86 | component |
| Heptane | $C_7H_{16}$ | 98 | | 100 | |
| Octane | $C_8H_{18}$ | 126 | | 114 | |
| Nonane | $C_9H_{20}$ | 151 | | 128 | |
| Decane | $C_{10}H_{22}$ | 174 | | 142 | |

1.3—Methanoleum

Methanoleum is also a mixture of alkanes: Pentane and Hexane. The higher energy concentration of liquid alkanes is shown Table 2, which contains the High Value Heat of Combustion, $(\Delta H_c)$, of alkanes relevant to this invention. To convert the gravimetric value $(\Delta H_c)_G$, given in [MJ/Kg], into the volumetric $(\Delta H_c)_V$, measured in [MJ/L], we used:

$$(\Delta H_c)_V \text{[MJ/L]} = (\Delta H_c)_G \text{[MJ/Kg]} \times \rho_{g/L} \times 10^{-3} \quad \text{[eq. 2]}$$

where $\rho_{g/L}$ is the density of the alkane given in [g/L].

Table 2 also includes the Volumetric Energy Concentration Ratio relative to Methane, ECR, given by:

$$ECR = \frac{(\Delta H_c)_{V,Cn}}{(\Delta H_c)_{V,CH4}} \quad \text{[eq. 3]}$$

where:

$(\Delta H_c)_{V,\ Cn}$ is the Heat of Combustion of the alkane with n carbons in the molecule, and $(\Delta H_c)_{V,\ CH4}$ is the Heat of Combustion of Methane

TABLE 2

Heat of Combustion, $(\Delta H_c)$, for relevant alkanes

| Fuel | $(\Delta H_c)_G$, HV MJ/Kg | Density @ 20° C. [g/L] Gas | Density @ 20° C. [g/L] Liquid | $(\Delta H_c)_V$ HV KJ/L | ECR | Included in the Methanoleum Mixture |
|---|---|---|---|---|---|---|
| Methane | 55.536 | 0.668 | | 37.1 | 1.00 | |
| Ethane | 51.926 | 1.265 | | 65.7 | 1.77 | |
| Propane | 50.404 | 1.867 | | 94.1 | 2.53 | |
| Butane | 49.595 | 2.493 | | 123.6 | 3.33 | |
| Pentane | 49.069 | | 626 | 30717.2 | 827.96 | ✓ |
| Hexane | 48.769 | | 659 | 32138.8 | 866.28 | ✓ |
| Heptane | 48.508 | | 684 | 33179.5 | 894.33 | |
| Octane | 48.374 | | 703 | 34006.9 | 916.63 | |

From Table 2 we see that liquid alkanes included in the Methanoleum, Pentane and Hexane, carry energy per unit volume higher than 800 times the energy carried by Methane.

1.4—Prior Art

Several studies on the UV photolysis of Methane and the consequent production of higher alkanes have been performed in the past. Some examples are given in table 3.

TABLE 3

UV sources in previous works

| # | Authors (Year) | UV Source | $E_{ph}$ Photon Energy•[eV] |
|---|---|---|---|
| 1 | A. R. Derk, H. H. Funke and J. L. Falconer (2008). | RF Krypton Discharge Lamp | 10.64 10.03 |
| 2 | Jaehong Park, Jungwoo Lee, Kijo Sim, Jin Wook Han and Whikun Yi (2008) | Four Wave Mixing of Krypton radiation | 10.2 |
| 3 | R. Gordon, Jr. and P. Ausloos (1967) | Air cooled electrodeless discharge lamps with Krypton or Argon | 10.03 11.83 11.61 |
| 4 | Bruce H, Mahan and Robert Mandal (1962) | Microwave discharge lamp with Krypton | 10.03 |
| 5 | M. A Gondal, Z. H. Yamani, A. Dastgeer, M. A. Ali, and A. Arfaj (2003) | Third Harmonic Nd:YAG Laser | 3.5 |
| 6 | C. Rozmarin, E. Arzoumanian, Et. Es-sebbar, A. Jolly, S. Errier, M.-C. Gazeau, Y. Benilan (2010) | 1 - KrF Pulsed Excimer Laser, 2 - $H_2$/He MW Discharge Lamp | 5.00 10.64 |

1.5—Innovations

Table 3 shows that in the prior investigations, the UV sources used in Methane's photolysis were: Discharge Lamps, Gas Lasers, Doped Isolator Lasers and Non-linear media Four Wave Mixing. In contrast, in the system described in this patent, the UV source is a Semiconductor LED or Laser. Semiconductor sources have the following advantages over the sources in the past investigations:

They can be produced with a specific emission line or band, thus, they have a better efficiency conversion of electricity to the desired spectral bands or lines.

They are more compact.

They do not need to be isolated from the Methane by an enclosure transparent to UV.

Another innovation of the present patent is the Photon Energy, $E_{ph}$, used to break the C—H bond of the Methane. In the earlier works, $E_{ph}$>10 eV. This high energy enables the photolysis of the C—H bond by elevating an electron from the ground electronic state to the first excited electronic state. In the present patent the C—H bond is broken by increasing the distance, $r_{C-H}$, between the H and the Methyl group by vibration. The energy needed by such process is the "Bond Dissociation Enthalpy", BDE. At T=298 K, the BDE of the $H_3$C—H bond is 104.99 (±0.07) Kcal/mol or 4.55 eV/molecule. A photon with this energy has a wavelength $\lambda_{dis}$=272.5 nm.

Another innovation of the present patent is the use of heated UV sources. This heating avoids the formation of thin polymer films that may cover the optics of the UV source and lower the UV transmittance.

Another innovation of the present patent is the use of a controlled temperature during photolytic reactions to produce desired alkanes. The gaseous reaction media is maintained at a temperature that enables the elongation reactions of short alkanes in order to convert the short alkanes into larger chains, while trapping-out the desired alkanes by condensation.

1.6—Chemical Reactions

For simplicity of the explanation, we will consider the NG, used in the process as raw material, contains mainly Methane, $CH_4$. We will assume that all the chemical reactions and physical separation effects take place in a closed volume that contains one or several UV sources. This volume will be called "Photoreactor".

1.6.1—Photochemical Initiation

The first reaction of the process is the initiation reaction [1] that occurs when UV photons break the C—H bond of Methane. This reaction has been very well studied for the last 40 years. At least, five different dissociation channels have been established:

$$CH_4 + h\nu(4.47\ eV) \rightarrow CH_3\cdot + H. \quad [1]$$

$$CH_4 + h\nu(5.01–6.04\ eV) \rightarrow CH_2\text{:} + H_2 \quad [1a]$$

$$CH_4 + h\nu(9.04–9.53\ eV) \rightarrow CH_2\text{:} + 2H. \quad [1b]$$

$$CH_4 + h\nu(9.06\ eV) \rightarrow CH + H_2 + H. \quad [1c]$$

$$CH_4 + h\nu(9.27\ eV) \rightarrow C + 2H_2 \quad [1d]$$

where hv represents ultra-violet photons. The energy values (in eV) given for the photons in each reaction are based on Romanzin et al. (2005). Since the photons used in the system described in the present patent have $E_{ph}$=4.55 eV, only reaction [1] is a feasible path for the photolysis of Methane. This assumption will be used in the rest of the present patent.

1.6.2—The Hydrogen Path

Generally, in a Methane saturated atmosphere, the radicals react with Methane to form successively higher alkanes. The general overall reaction is:

$$nCH_4 \rightarrow C_nH_{2n+2} + (n-1)H_2 \quad [2]$$

In Methane saturated atmospheres, the most probable reaction for the Hydrogen radical will be the formation of a Hydrogen molecule, while reacting with Methane:

$$H. + CH_4 \rightarrow CH_3\cdot + H_2 \quad [3]$$

To avoid the reverse reaction:

$$CH_3\cdot + H_2 \rightarrow H. + CH_4 \quad [3]_R$$

the $H_2$ is filtered out from the System through a Membrane Hydrogen Filter, by Buoyancy or Centrifugally. The filtered out Hydrogen molecules are transferred to an Electricity Generator, where the $H_2$ is oxidized by ambient Oxygen.

$$2H_2 + O_2 \rightarrow 2H_2O \quad [4]$$

1.6.3—Reactions of the Methyl Radical with Methane

The concentration of Methyl radicals in the Photoreactor increases constantly since:

The UV Sources are active continuously and reaction [1] is taking place all the time.

All the Hydrogen radicals are converted into Methyl radicals by the propagation reaction [3].

Hydrogen molecules are extracted from the Photoreactor, so the possibility of the reverse reaction $[3]_R$ is avoided continually.

In Methane saturated atmosphere, as the one that exists in the Photoreactor, the Methyl radical reacting with Methane molecules, has 2 probable paths:

$$CH_3\cdot + C'H_4 \rightarrow CH_4 + C'H_3. \quad [5]$$

$$CH_3\cdot + CH_4 \rightarrow C_2H_6 + H. \quad [6]$$

At the first look reaction [5] may be considered as a meaningless "dummy" reaction. In the absence of isotopic marking it is impossible to follow its existence. But, reaction [5] enables, in rich Methane environments, a very long "life time" to the Methyl radical and the increase of Methyl radical concentration in the Photoreactor.

Reaction [6] has a low probability to occur because of steric hindrance reasons. But, since the population of Methane is big, it may occur. The resulting H. from reaction [6] will enter into the Hydrogen path described in paragraph 1.6.2. This statement also is valid for other H. formed in reactions that will be presented in the following paragraphs.

1.6.4—Ethane Formation by Termination

Let's assume a constant irradiation of UV photons into the gas mixture. After a radiation period, $\Delta t_1$, the concentration of the Methyl radical will increase at such a point that the formation of Ethane by the termination reaction [7] will become significant.

$$2CH_3\cdot \rightarrow C_2H_6 \quad [7]$$

This probability is dictated by the thermodynamic "Equilibrium Constant of the reaction [7]":

$$K_7 = \frac{[C_2H_6]}{[CH_3\bullet]^2} \quad [Eq. 4]$$

where $[CH_3.]$ is the concentration of the Methyl radical and $[C_2H_6]$ is the concentration of the Ethane.

1.6.5—From Ethane to Propane

After a time period the gaseous mixture contains mainly molecular Methane, but also traces of the reactive Methyl radical and molecular Ethane. At a time $\Delta t_2$ from the beginning of the process, where $\Delta t_2 \gg \Delta t_1$, the concentration of Ethane will reach a level where its presence affects the chemistry of the gas. The formation of the Ethyl radical may be predicted by the following reactions:

$$\text{Photolytic Initiation: } C_2H_6 + h\nu \rightarrow C_2H_5\cdot + H. \quad [8]$$

$$\text{Propagation: } C_2H_6 + CH_3\cdot \rightarrow C_2H_5\cdot + CH_4 \quad [9]$$

The Ethyl radical has a very short "life time" in a Methane saturated atmosphere. The reverse reaction of [9] is responsible for this short "life time":

$$C_2H_5\cdot + CH_4 \rightarrow C_2H_6 + CH_3. \quad [9]_R$$

Since the relative concentration of Methyl radicals is high, Propane may be formed by two different reactions:

$$\text{Termination: } C_2H_5\cdot + CH_3\cdot \rightarrow C_3H_8 \quad [10]$$

$$\text{Propagation: } C_2H_6 + CH_3\cdot \rightarrow C_3H_8 + H. \quad [11]$$

Reaction [11] has a low probability to occur because of steric hindrance reasons. But, since the concentration of methyl radical is big, it may occur.

1.6.6—From Propane to Higher Alkanes

For reactions of alkanes (having a generic formula $C_nH_{2n+2}$) in a rich Methane atmosphere, the general photolytic initiation reaction will be:

$$C_nH_{2n+2} + h\nu \rightarrow C_nH_{2n+1}\cdot + H. \quad [12]$$

The Hydrogen radical will react as given in reaction [3] and it will follow the Hydrogen path explained in paragraph 1.6.2.

The Alkyl radical, $C_nH_{2n+1}\cdot$, will probably react with the surrounding Methane molecule to produce a Methyl radical:

$$C_nH_{2n+1}\cdot + CH_4 \rightarrow C_nH_{2n+2} + CH_3. \quad [13]$$

But also the substitution reaction (with low probability for steric reasons) may occur:

$$C_nH_{2n+1}\cdot + CH_4 \rightarrow C_{n+1}H_{2n+4} + H. \quad [14]$$

The termination reaction with the methyl radical is the main route for the formation of longer alkane molecules:

$$C_nH_{2n+1}\cdot + CH_3\cdot \rightarrow C_{n+1}H_{2n+4} \quad [15]$$

The experimental results show that the relative concentration of the produced alkenes will obey a Flory Distribution (Derk, 2008). This is in accordance with the chemical reactions sequence described in this last section.

1.6.7—Other Termination Reactions and Branched Isomer Formation

As the concentration of different alkyl radicals increases, the possibility of other termination reactions becomes significant. The general formulation of this possibility is:

$$C_nH_{2n+1}\cdot + C_{n'}H_{2n'+1}\cdot \rightarrow C_{n+n'}H_{2(n+n')+2} \quad [16]$$

Steric hindrance gives preference to the formation of the linear isomer. But, with a lower probability, branched isomers are also formed by reaction [15] and [16]. Branching isomerization can be obtained also by the use of selective membranes or by radical internal reorganization.

BRIEF DESCRIPTION OF THE DRAWINGS

In conjunction with the appropriate figures, four non-limited embodiments will be described. The exemplary embodiments concentrate on the production of "not-from-petroleum gasoline", NGG, and Methanoleum, using NG as raw material and Ultra-Violet radiation to produce photolytic reactions. Both products, NGG and Methanoleum, will be named "Products" in the following descriptions. Similar embodiments may be used in the synthesis of other materials by irradiation of NG with UV radiation.

The figures are not shown to scale and any sizes are only meant to be exemplary and not necessarily limiting. Corresponding or like elements are designated by numerals and names. It will be understood by those skilled in the art that various changes may be made and equivalents may be substituted for elements thereof without departing from the scope of the subject matter. In addition, many modifications may be made to adapt a particular situation or material to the teachings without departing from the essential scope thereof. For example, in the exemplary embodiments, only two methods are used for the physical separation of alkanes from the reaction mixture: (A) the Boiling Points, b.p. of the alkanes, and (B) the Buoyancy. But other separation methods, like Centrifugal Forces or Selective Membranes may be used.

In the drawings, solid arrows, → indicate the direction of the fluid. The components and sub-components are linked to their corresponding numbers by dashed arrows, ----▶.

In the First Exemplary Embodiment the Products are obtained at temperatures higher than Standard Temperature and Pressure, >STP, conditions.

Figure 1:
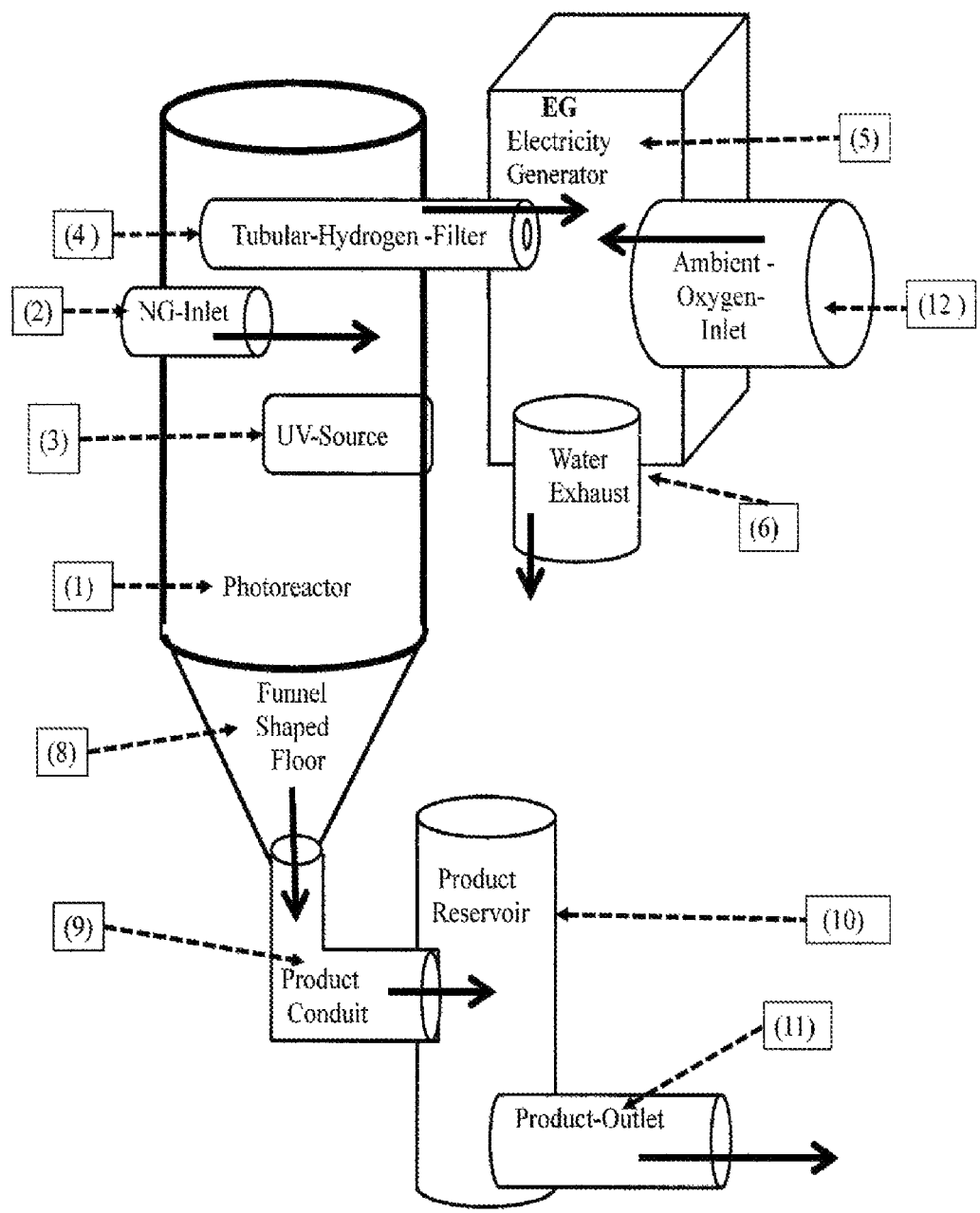

FIG. 1 is a schematic description of the components of the First Exemplary Embodiment.

In the Second Exemplary Embodiment the Products are obtained after compression of the NG.

Figure 2:
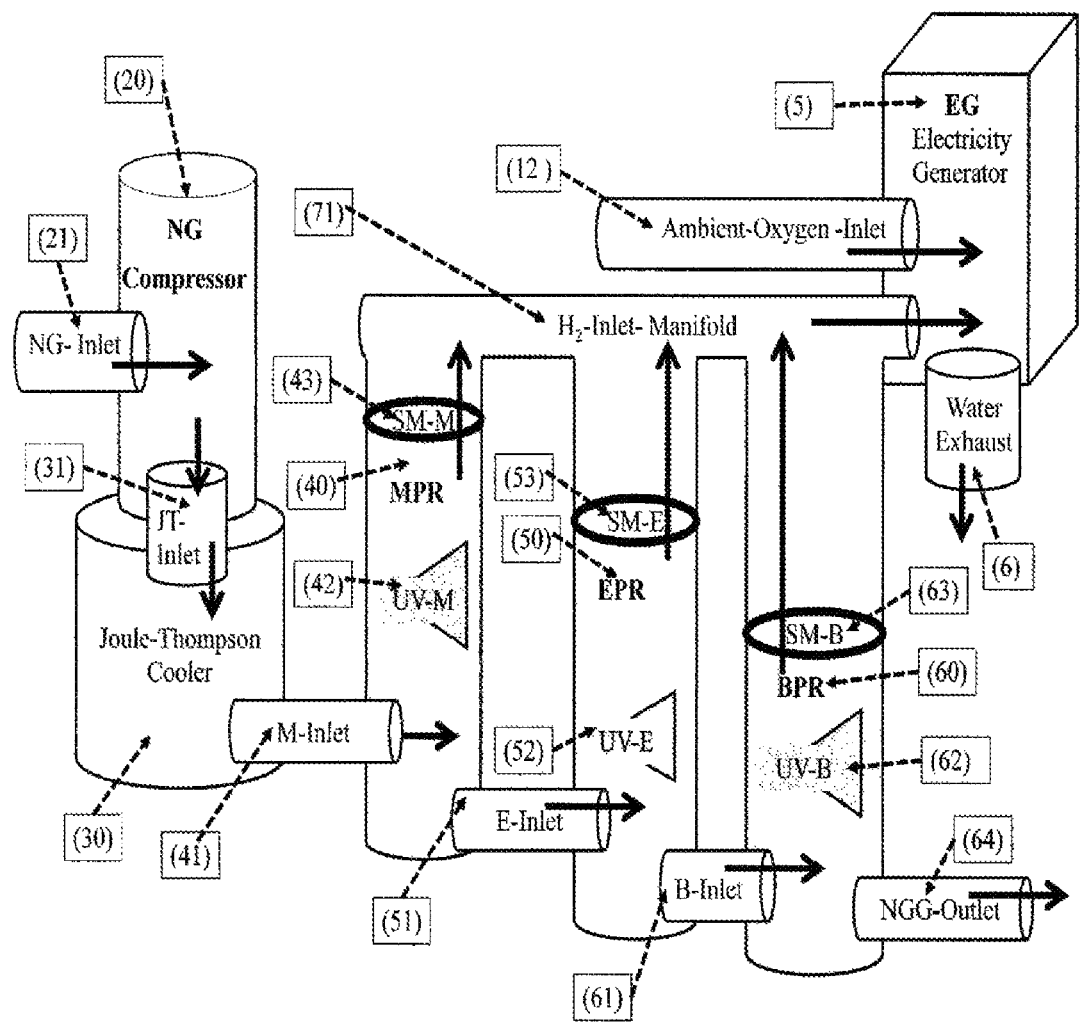

FIG. 2 is a schematic description of the components of the Second Exemplary Embodiment.

In the Third Exemplary Embodiment the Products are obtained from Liquid Natural Gas, LNG that serves as raw material and as cooling fluid.

Figure 3:
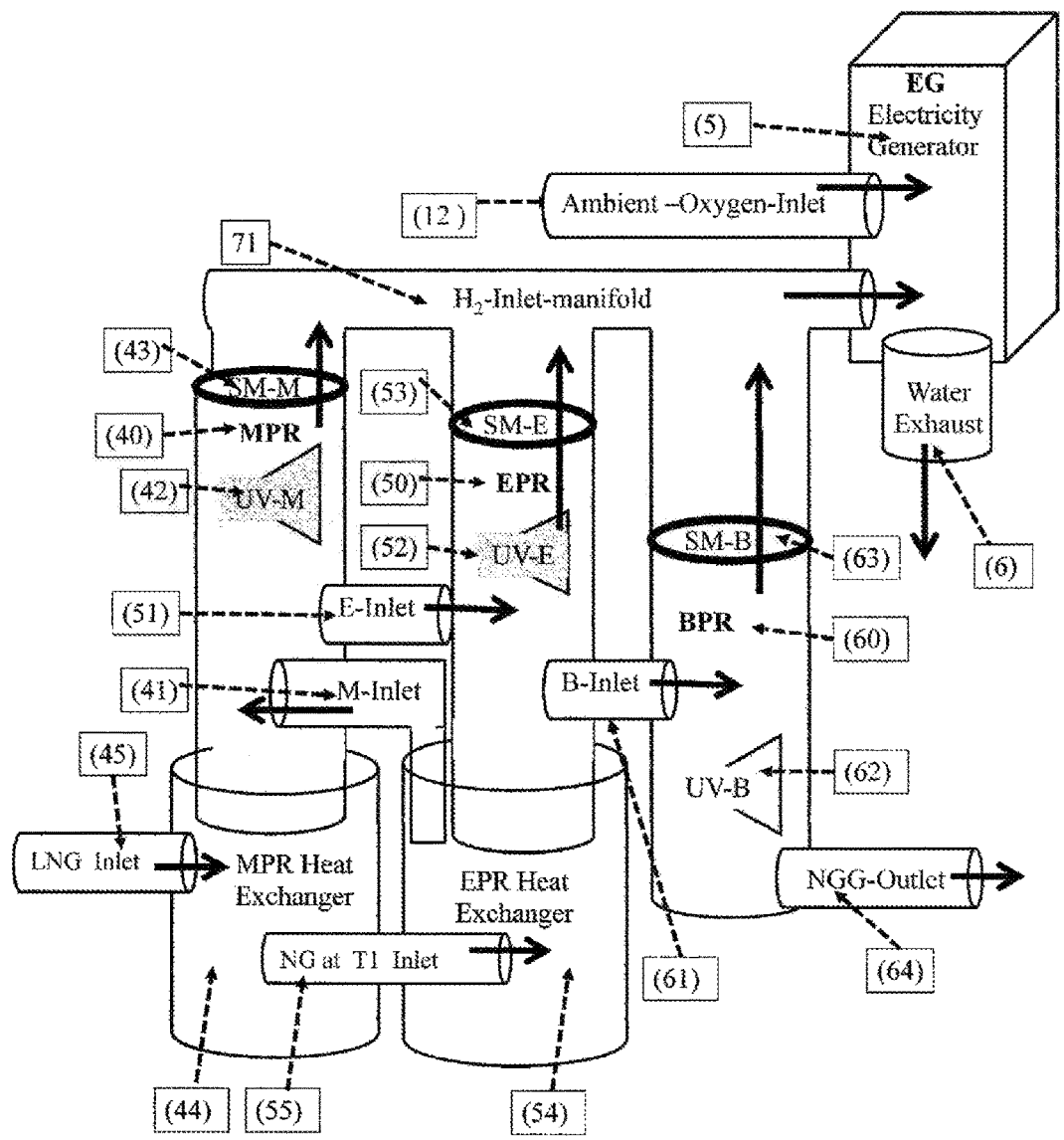

FIG. 3 is a schematic illustration of the Third Exemplary Embodiment.

In the Fourth Exemplary Embodiment the Products are obtained from Natural Gas at temperatures higher than Standard Temperature and Pressure, >STP, conditions. But in this case the photoreactor is slanted.

Figure 4:
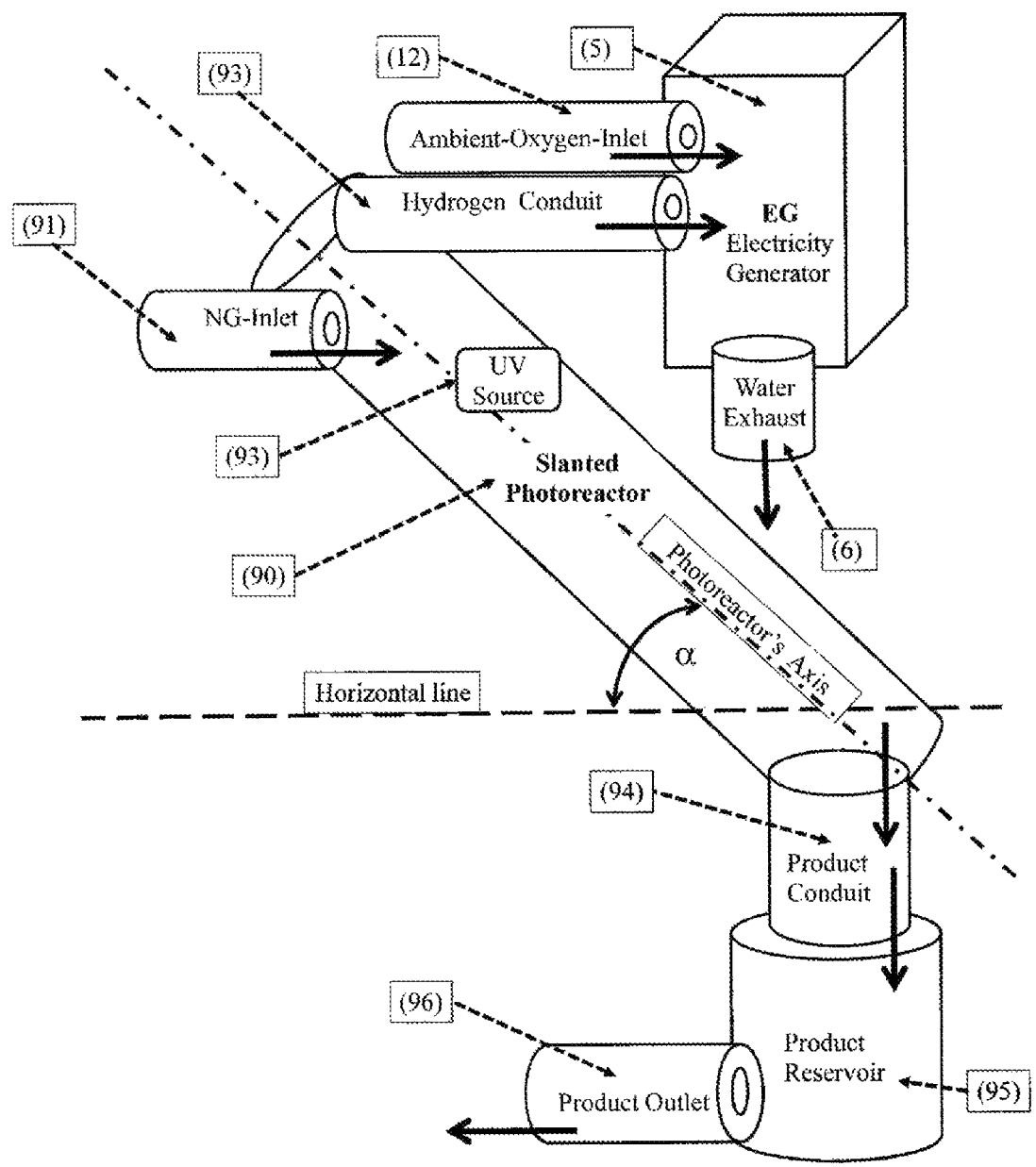

FIG. 4 is a schematic description of the Fourth Exemplary Embodiment.

Figure 5:
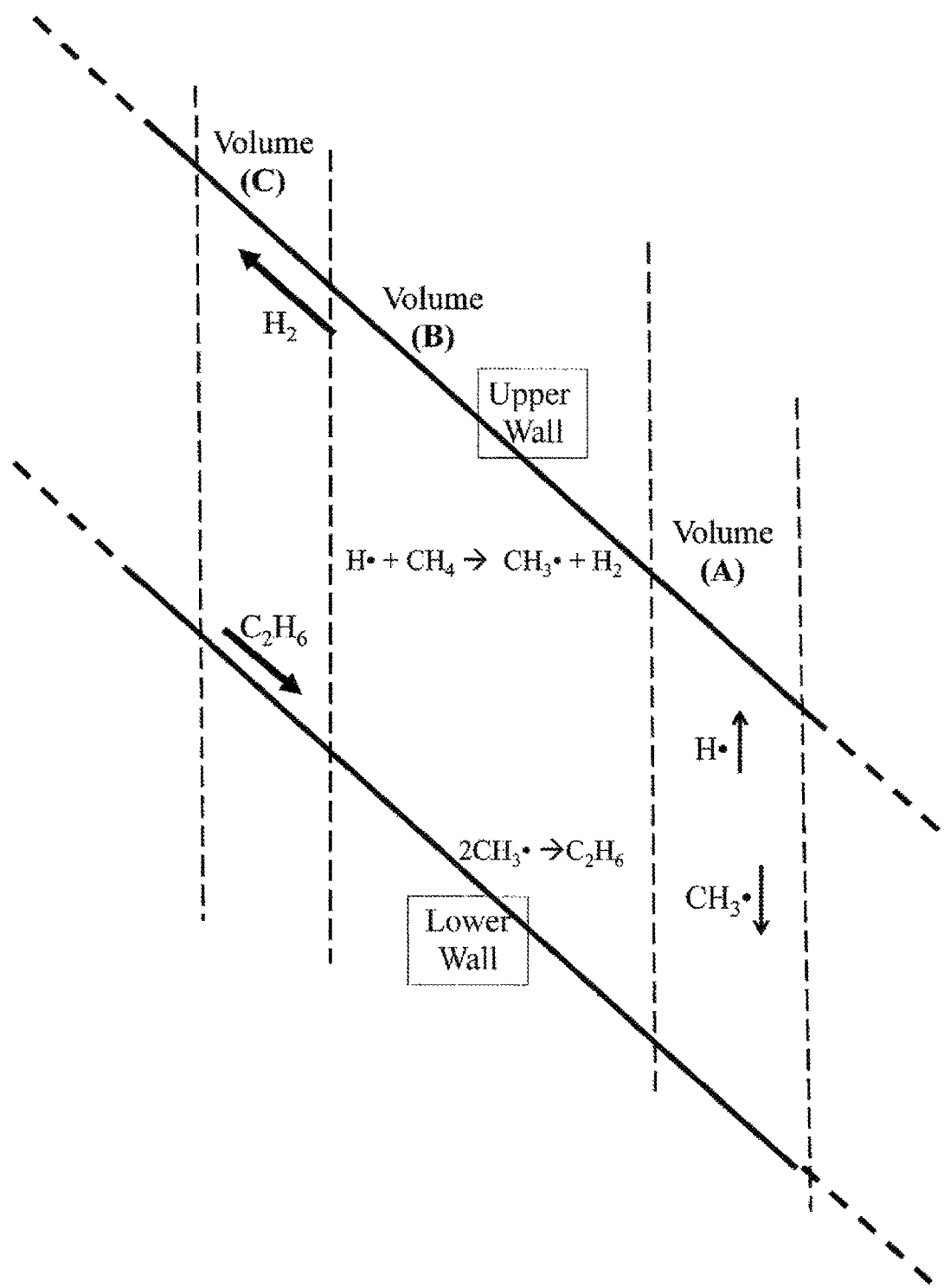

FIG. 5 is a schematic description of influence of the Angle of Inclination of the slanted photoreactor to the reactions in the Fourth Exemplary Embodiment.

FIRST EXEMPLARY EMBODIMENT 3.1—Description of the First Exemplary Embodiment

In the First Exemplary Embodiment the Products are obtained at temperatures higher than Standard Temperature and Pressure, >STP, conditions. FIG. 1 is a schematic description of the First Exemplary Embodiment. The components of this embodiment, relevant to explanation of the patent, are given in table 4.

Through the "NG-Inlet" (2) NG is introduced into the Photoreactor (1). The UV-Sources (3) emit UV photons that break the C—H bonds of the Methane into two radicals: Methyl ($CH_3$.) and Hydrogen (H.). This initiation reaction is the beginning of a series of radical reactions described in paragraph 1.6. The system is designed in a way that, at least, the two kinds of mixtures of alkanes, defined before as "Products", can be formed:

The reactions produce, beside the Products, molecular Hydrogen, $H_2$. At the top of the Photoreactor (1) a Tubular Hydrogen Membrane Filter (4) is installed. It is a tube, made of a selective membrane with high permeability for $H_2$ while highly impermeable towards alkanes. Thus, it extracts out the $H_2$ formed in the Photoreactor (1), and transfers the extracted $H_2$ to the Electricity Generator, EG (5).

In the EG (5) the $H_2$ is oxidized with air Oxygen, incoming from the surrounding air through the Ambient-Oxygen-Inlet (12) to produce electricity and water. The Water Exhaust (6) will expel out the water from the EG, while the electricity will be conducted by the Electrical Wires (7) to activate the UV-sources (3) or other electricity consuming parts of the system.

The lower part of the Photoreactor (1) is a Funnel Shaped Floor, FSF (8). This component has two tasks:

To collect the alkanes, produced by the radical reactions, which condense at temperatures $T_{PhR}$.

To avoid the over-radiation of the condensed alkanes. Over-radiation creates waxes that are undesired in the synthesis of NGG or Methanoleum.

TABLE 4

Components of the First Exemplary Embodiment

| # | Name | Task/Description |
|---|------|------------------|
| 1 | Photo-reactor | A volume where photoreactions, radical reactions and condensation of alkanes take place. The volume is included in a tall cylinder, with a high from 1 to 150 meters. |
| 2 | NG-Inlet | Introduces the NG into the Photoreactor (1). The NG is introduced at the upper part of the Photoreactor (1), at a small distance bellow the Tubular Hydrogen Filter (4). |
| 3 | UV-Sources | To provide UV photons that break the C—H bonds of the Methane and of the other alkanes formed. There are one or more sources, installed in the Photoreactor (1). Each source can be operated independently of the others. |
| 4 | Tubular Hydrogen Membrane Filter | To remove the $H_2$ formed in the Photoreactor (1) and to transport the extracted $H_2$ to the Electricity Generator (5) |
| 5 | Electricity Generator, EG | Production of electricity by the oxidation of the $H_2$ with Oxygen from the ambient. As an exemplary possibility, the Electricity Generator may be a Fuel Cell, but other electricity generators or sources may be used. |
| 6 | Water Exhaust | To expel the water formed in the EG (5) during the electricity production. |
| 7 | Electric Wires | To conduct the electricity from the EG (5) to the UV Sources (3) and other electricity consuming parts of the embodiment. |
| 8 | Funnel Shaped Floor, FSF | Located in the lower part of the Photoreactor (1). It is designed to collect the alkanes that condense at a determinate temperature, $T_{PhR}$. The component behaves like a cooled funnel with an orifice at his bottom. The FSF component can be maintained at RT by:<br>Contact with the ambient air, or<br>By the stream of NG, before it is injected into the Photoreactor (1)<br>The condensate is the NGG or the Methaneoleum, depending on $T_{PhR}$. |
| 9 | Product Conduit | To translate the condensed Products at the Funnel Shaped Floor (8) to the Products Reservoir (10). Gives to the Products thermal isolation from the temperature in the Photoreactor (1). |
| 10 | Product Reservoir | Storage of the Products |
| 11 | Product Outlet | Outlet to the market or storage. |
| 12 | Ambient-Oxygen-Inlet | To supply Oxygen to the Electricity Generator (5) for the oxidation of the Hydrogen extracted from the Photoreactor (1). |

3.2—Principle of Operation of the First Exemplar Embodiment 3.2.1—General

The selected Product, NGG or Methanoleum, is formed in the system depicted in FIG. 1 in the following way:

The mixture of condensed alkanes falls through the orifice of the FSF (8) to the Product-Conduit (9). This Conduit translates the condensed Product at the FSF (8) to the Product Reservoir (10) while thermally isolating the Product from the temperature in the Photoreactor (1). The Product is stored in the Product Reservoir (10) for delivery to the customers through the Product Outlet (11).

During the process, NG is injected to the Photoreactor (1) through the NG Inlet (2), because the pressure tends to decrease since:

Hydrogen is extracted from the Photoreactor (1).

The alkanes formed have Van der Walls Attraction Forces stronger than those of the initial Methane.

The condensed Products are taken out from the gaseous mixture.

If the decrease in pressure is not compensated:

Hydrogen will not pass through the membrane of the Tubular Hydrogen Membrane Filter (4), and;

The lower concentration of gas molecules will reduce the absorption of UV photons. In consequence of the absorption reduction, the rate of initiation reactions will decrease and the formation of the products will slow down.

3.2.2—NGG and Methanoleum Condensation

Heat is induced to gaseous phase of the Photoreactor (1) to maintain $T_{PhR}$, in four ways:

The UV source converts electrical energy to UV radiation with an efficiency $\varepsilon_{UV}$ smaller than unity. $\varepsilon_{UV}$ is given by:

$$\varepsilon_{UV}=1-\varepsilon_{IH}-\varepsilon_{EH} \quad [\text{Eq. 5}]$$

where:

$\varepsilon_{IH}$—(Inner Heating Efficiency) is the "Joule Heating" energy given by the UV Source (3) directly to the gas mixture by Conduction, Convection and Radiation. This energy is one of the 4 sources that heat the gas mixture; and $\varepsilon_{EH}$—(External Heating) is energy lost by the electrical circuit that activates the source, outside from the Photoreactor (1).

Energy is released to the gaseous phase during the termination reactions.

Condensation of the NGG and Methanoleum molecules is an exothermic phenomenon.

Residual heat from the Electrical Generator (5) may be transported to the Photoreactor (1).

Cooling also occurs in the Photoreactor (1) by the following ways:

The extraction of $H_2$, using the Tubular Hydrogen Filter (4)

The usual heat losses (Conduction, Convection and Radiation) of the external walls of the Photoreactor (1)

The simultaneous processes of cooling and heating bring the gaseous mixture in the Photoreactor (1) to an equilibrium temperature, $T_{PhR}$. When producing NGG, the system is planned in such a way that $T_{PhR}$ will be high enough to maintain alkanes with a certain n, $n_c$, like $n_c=5$, 6 and 7, to stay in the gaseous phase. This will enable reactions of the alkanes with $n_c$ to form alkanes with $n>n_c$. For example if $T_{eq}=40°$ C., all isomers of pentane will stay in the gaseous phase where they can be converted into heavier alkane molecules.

When the desired product is NGG, $T_{PhR}$ should not be too high, since this will maintain in the gaseous phase alkanes with $n>n_c$ that may be enlarged to form large chain alkanes that solidify at room temperature. These large chain alkanes are known as "waxes", and are not part of the NGG mixture or the Methanoleum mixtures. Of course, if the goal is to manufacture such waxes, higher temperatures will be used in the process. Table 5 includes the boiling points, b.p., of the alkane isomers relevant to the discussion.

TABLE 5

Boiling Points of some alkane isomers involved in the invention

| Alkane | Formula | Isomer | bp [° C.] |
|---|---|---|---|
| Pentane | $C_5H_{12}$ | 2,2-methylpropane | 9.5 |
| | | 2-ethylbutane | 27.7 |
| | | Linear | 36.0 |
| Hexane | $C_6H_{14}$ | 2,2-dimethylbutane | 49.7 |
| | | 2,3-dimethylbutane | 58.0 |
| | | 2-methylpentane | 60.3 |
| | | 3-methylpentane | 63.3 |
| | | Linear | 68.7 |
| Heptane | $C_7H_{16}$ | 2,2-dimethylpentane | 79.2 |
| | | 2,4-dimethylpentane | 80.4 |
| | | 2,2,3-trumethyl pentane | 80.8 |
| | | 3,3-dimethylpentane | 86.0 |
| | | 2,3-dimethylpentane | 89.7 |
| | | 2-methylhexane | 90.0 |
| | | 3-methylhexane | 92.0 |
| | | 3-ethylpentane | 93.5 |
| | | Linear | 98.5 |
| Octane | $C_8H_{18}$ | 2,2,4-trimethylpentane (isooctane) | 99 |
| | | 2,2-dimethylhexane | 107 |
| | | 2,2,3,3-tetramethylbutane | 107 |
| | | 2,5-dimethylhexane | 109 |
| | | 2,4-dimethylhexane | 110 |
| | | 2,2,3-trimethylpentane | 110 |
| | | 3,3-dimethylhexane | 112 |
| | | 2,3,4-trimethylpentane | 113 |
| | | 2,3,3-trimethylpentane | 115 |
| | | 2,3-dimethylhexane | 116 |
| | | 3-ethyl-2-methylpentane | 116 |
| | | 2-methylheptane | 118 |
| | | 4-methylheptane | 118 |
| | | 3,4-dimethylhexane | 118 |
| | | 3-ethyl-3-methylpentane | 118 |
| | | 3-methylheptane | 119 |
| | | 3-ethylhexane | 119 |
| | | Linear | 126 |

3.2.3—Effect of Buoyancy

At the beginning of the process, we presume that the Photoreactor (1) is a column full with a single fluid: gas Methane. During the reactions other gases, different than Methane, are formed. The gases formed will be affected by Buoyancy that will induce a small separation with height of the different molecules in the gas mixture due to their different density. Table 6 includes the density of the different gases and liquids present in the Photoreactor (1).

TABLE 6

Densities of the participating molecules

| Alkane | Formula | MM [amu] | Density @ 20 C. [g/L] Gas | Density @ 20 C. [g/L] Liquid |
|---|---|---|---|---|
| Hydrogen | $H_2$ | 2 | 0.09 | |
| Methane | $CH_4$ | 16 | 0.668 | |
| Ethane | $C_2H_6$ | 30 | 1.265 | |
| Propane | $C_3H_8$ | 44 | 1.867 | |
| Butane | $C_4H_{10}$ | 58 | 2.493 | |
| Pentane | $C_5H_{12}$ | 72 | | 626 |
| Hexane | $C_6H_{14}$ | 86 | | 659 |
| Heptane | $C_7H_{16}$ | 100 | | 684 |
| Octane | $C_8H_{18}$ | 114 | | 703 |
| Nonane | $C_9H_{20}$ | 128 | | 718 |
| Decane | $C_{10}H_{22}$ | 142 | | 730 |

In the gas mixture, the movement and relative position of the molecules is affected not only by the Buoyancy, but also by Gravity, Thermal Energy and the Viscosity. But Buoyancy will add a force vector that produces a slight separation between the components of the gas mixture.

Hydrogen molecules will tend to be in a higher concentration at the higher part of the Photoreactor (1) column, relative to the other parts of the column. Going down the column will be a volume richer in Methane, relative to the rest of the column. Below the relative Methane-rich volume, there is a volume where Ethane will have a higher concentration, relative to the rest of the Photoreactor (1). The lower part of the Photoreactor (1) will contain a gas mixture relatively richer in the higher alkanes, butane and pentane. In the volume of the Funnel Shaped Floor (8) will be occupied by the alkanes that condense at $T_{PhR}$=40 C, for example.

Another way to explain Buoyancy in the Photoreactor (1) is to think of the fluid gas Methane as it would be water. Objects with specific mass lower than water will float on the water's surface. In the case of the Photoreactor (1), the Hydrogen will "float" over the Methane. Molecules with specific mass higher than Methane will "sink" down from the Methane.

3.2.4—Effect of Miscibility and Vapor Pressure

Ideally, since the gas mixture in the Photoreactor (1) is maintained at $T_{PhR}$, alkanes formed in the reactions having b.p.>$T_{PhR}$ will stay in the gaseous phase while those with b.p.<$T_{PhR}$ will condensate. For example if $T_{PhR}$=40° C., based on data given in table 5, all the isomers of Pentane will stay in the gaseous phase. This will enable further chain elongation of the Pentane molecules via the reactions 14 and 15.

Also ideally, at $T_{PhR}$=40° C. alkanes with n≥6 to n=10 will condense. But in real conditions, the condensable alkanes will first form droplets. These droplets will be affected by two processes:

Adhesion between small droplets

Adsorption of small alkanes (Methane, Ethane, Propane and Butane). Since these small alkanes are soluble in higher alkanes, they will dissolve into the droplets.

The adhesion of the droplets and the dissolution of alkanes with n≤4, will increase in the size and mass of the droplets. The heavier droplets will sink into the funnel shaped floor containing the alkanes with n≤4 as impurities. The alkanes, with n≤4, do not belong to the NGG mixture and can be extracted by a mild distillation or by selective membranes.

Another concern that should be taken into account, in real conditions, is the high vapor pressure of the components of the NGG and the Metanoleum. For this reason the gaseous phase of the system will contain also vapor molecules of alkanes with n>6 that ideally condense at $T_{PhR}$.

Alkane molecules with n>6 that remain in the gaseous phase can be converted into alkanes with n higher than 6. This possibility is in favor of the formation of NGG as long as n≤10. Alkanes with n>10 are solid waxes that do not belong to the NGG mixture.

SECOND EXEMPLARY EMBODIMENT 4.1—Schematic Description of the Second Exemplary Embodiment FIG. 2 is a schematic description of the Major components and Sub-components of this embodiment. The 6 Mayor components of this embodiment and their sub-components are listed in table 7.

All the Major components have an Inlet. The 3 Photoreactors have, beside the inlet, other corresponding components:

UV Radiation Sources (UV)

Hydrogen Selective Membranes (SM), and

Hydrogen Outlets (HO)

The letters M, E, and B indicate Methane, Ethane and Butane respectively.

TABLE 7

Major Components and sub components of the Second Exemplary Embodiment

| Component | Mayor | | | Sub-Components | |
|---|---|---|---|---|---|
| Number | Component | Initials | Task | Name | Number |
| 20 | Natural Gas Compressor | NGC | Compression of the NG | NGC-Inlet | 21 |
| 30 | Joule-Thompson Cooler | JT | Cooling of the NG | JT-Inlet | 31 |
| 40 | Methane Photoreactor | MPR | Photolysis of a C—H bond of Methane and formation of Ethane | M-Inlet UV-M SM-M | 41 42 43 |
| 50 | Ethane Photoreactor | EPR | Photolysis of a C—H bond of Ethane and formation of Butane | E-Inlet UV-E SM-E | 51 52 53 |
| 60 | Butane Photoreactor | BPR | Photolysis of a C—H bond of Butane and formation of Octane | B-Inlet UV-B SM-B NGG-Outlet | 61 62 63 64 |
| 5 | Electricity Generator | EG | Production of electricity by the oxidation of Hydrogen | $H_2$-Inlet-Manifold Ambient-$O_2$-Inlet Water Exhaust | 71 12 6 |

4.2—Principle of operation of the Second Exemplary Embodiment 4.2.1—Operation of the NGC (20) and the Joule Thompson Cooler (30)

As shown in FIG. 2, NG, mostly Methane, is introduced to the NGC, Natural Gas Compressor (20) trough the NGC-Inlet (21). At the NGC (20) the gas Methane is compressed to a high pressure $P_{NGC}$.

The compressed NG in the NGC (20) flows through the "JT-Inlet" (31) to the Joule Thompson Cooler (30), JT. At the JT Cooler (30) the NG expands to a pressure P1<$P_{NGC}$ while cooling to the temperature T1.

The cooled gas NG from the JT (30) is introduced to the Methane Photoreactor MPR, (40), by the "M-Inlet". The MPR is maintained at the temperature T1.

4.2.2—Operation of the MPR (40)

In the MPR (40) the NG is irradiated with the corresponding Ultra-Violet source UV-M (42). The initiation photoreaction [1] and the subsequent radical reactions take place. As a consequence of these reactions, Ethane and Hydrogen are formed following the overall reaction:

$$2CH_4 + h\nu \rightarrow C_2H_6 + H_2 \qquad [17]$$

The temperature T1 is selected in such a way that Methane stays in the gaseous phase while Ethane condenses into the liquid phase. This means that T1 is between the temperature interval from the b.p. of the Methane and the b.p of the Ethane. For example, if:

The pressure in the MPR is 1 atm., and
We neglect the solubility of Methane in liquid Ethane at T1, the temperature interval of T1 will be given by the values quoted in table 8. The table contains also an exemplary temperature value selected.

TABLE 8

Exemplary Selection of T1

| Alkane | Boiling Point at 1 atm. [° C.] | T1 selected as an example |
|---|---|---|
| Methane | −162 | −95° C. |
| Ethane | −89 | |

The molecular Hydrogen formed in MPR (40) is filtered out from Photoreactor (20) through the Selective Membrane of the MPR, SM-M (43). The filtered-out Hydrogen is brought to the "H$_2$-Inlet-Manifold", (71) that feeds the Electricity Generator (5), EG.

The Ethane produced, that is liquid at T1, condenses and sinks to the bottom of the MPR (40). At this point it is translated to the Ethane Photoreactor, EPR (50), via the "E-Inlet" (51).

4.2.3—Operation of the EPR (50)

The liquid Ethane transferred to the EPR (50) is heated to the temperature T2, where it becomes gaseous. In the EPR (50) the gaseous Ethane is irradiated with the Ultra-Violet source (52), UV-E. An initiation photoreaction where a C—H bond of the Ethane is broken into atomic Hydrogen and Ethyl radical occurs, as described before by the reaction [8].

$$C_2H_6 + h\nu' \rightarrow C_2H_5 \cdot + H \cdot \qquad [8]$$

The use of $\nu'$ is done to note that the C—H bond in Ethane (and other alkanes higher than Methane) has an BDE of 101 Kcal/mol (4.38 eV/molecule, 283.1 nm). This value is smaller than the BDE of Methane, 105 Kcal/mol (4.55 eV/molecule, 272.5 nm).

In a Ethane saturated atmosphere, as the one that exists in the EPR (50), the most probable reaction for the Hydrogen radical will be the formation of a Hydrogen molecule, while reacting with Ethane:

$$H \cdot + C_2H_6 \rightarrow C_2H_5 \cdot + H_2 \qquad [18]$$

To avoid the reverse reaction:

$$C_2H_5 \cdot + H_2 \rightarrow H \cdot + C_2H_6 \qquad [18]_R$$

the H$_2$ molecules are filtered out from the EPR through the EPR's Selective Membrane Hydrogen Filter, SM-E (53). The overall effect of reactions [8] and [18] is the formation of two Ethyl radicals and one Hydrogen molecule, H$_2$, each time that a photon breaks a C—H bond in an Ethane molecule.

In an Ethane saturated atmosphere, like the one that exists in the EPR, there is "dummy" reaction:

$$C_2H_6 + C_2H_5 \cdot \rightarrow C_2H_5 \cdot + C_2H_6 \qquad [19]$$

In the absence of isotopic marking it is impossible to follow existence of reaction [19]. But, reaction [19] enables, in rich Ethane environments, a very long "life time" to the Ethyl radical and the increase of Ethyl radical concentration in the EPR (50).

The concentration of Ethyl radicals in the EPR (50) will increase constantly since:

The UV Source is active continuously and reaction [8] is taking place all the time.
All the Hydrogen radicals are converted into Ethyl radicals in the propagation reaction [18].
Hydrogen molecules are extracted from the EPR, so the possibility of the reverse reaction $[18]_R$ is avoided continuously.

After an irradiation period, the concentration of the Ethyl radical will increase at such a point that the formation of Butane by the termination reaction [20] will become significant:

$$2C_2H_5 \cdot \rightarrow C_4H_{10} \qquad [20]$$

The temperature T2 is selected in such a way that Ethane stays in the gaseous phase while Butane condenses into a liquid phase. This means that T2 is between the temperature interval from the b.p. of the Ethane and the b.p of the Butane. For example, if:

The pressure in the EPR (50) is 1 atm., and
We neglect the solubility of Ethane in liquid Butane at T2, the temperature interval of T2 will be given by the values quoted in table 9. The table contains also an exemplary temperature selected value.

TABLE 9

Exemplary Selection of T2

| Alkane | Boiling Point at 1 atm. [° C.] | T2 selected as an example |
|---|---|---|
| Ethane | −89 | −5° C. |
| Butane | 0 | |

The Butane produced in the EPR (50) that is liquid at T2, condenses and sinks to the bottom of the EPR (50). At this point it is translated to the Butane Photoreactor, BPR (60), via the B-Inlet (61).

4.2.4—Operation of the BPR (60)

The liquid Butane transferred to the BPR (60) is heated to a temperature T3, where it becomes gaseous. In the BPR (60) the gaseous Butane is irradiated with the BPR's Ultra-Violet source, UV-B (62). An initiation photoreaction, where a C—H bond in the Butane is broken into atomic Hydrogen and Butyl radical, takes place:

$$C_4H_{10} + h\nu' \rightarrow C_4H_9 \cdot + H \cdot \qquad [21]$$

In a Butane saturated atmosphere, as the one that exists in the BPR (60), the most probable reaction for the Hydrogen radical will be the formation of a Hydrogen molecule, while reacting with Butane:

$$H \cdot + C_4H_{10} \rightarrow C_4 + H_2 \qquad [22]$$

To avoid the reverse reaction:

$$C_4H_9 \cdot + H_2 \rightarrow H \cdot + C_4H_{10} \quad [22]_R$$

the $H_2$ molecules are filtered out by the BPR's Selective Membrane Hydrogen Filter SM-B (63). The overall effect of reactions pi and [22] is the formation of two Butyl radicals and one Hydrogen molecule, $H_2$, each time that a photon breaks a C—H bond in a Butane molecule.

In a Butane saturated atmosphere, like the one that exists in the BPR, there is "dummy" reaction:

$$C_4H_9 \cdot + C_4H_{10} \rightarrow C_4H_{10} + C_4H_9 \cdot \quad [23]$$

In the absence of isotopic marking it is impossible to follow existence of reaction [23]. But, reaction [23] enables, in rich Butane environments, a very long "life time" to the Butyl radical and the increase of Butyl radical concentration in the BPR (60).

The concentration of Butyl radicals in the BPR will increase constantly since:

The UV Source is active continuously and reaction [21] is taking place all the time.

All the Hydrogen radicals are converted into Butyl radicals in the propagation reaction [22]

Reaction $[22]_R$ is avoided continually

After an irradiation period, the concentration of the Butyl radical will increase at such a point that formation of Octane by the termination reaction [24] will become significant:

$$2C_4H_9 \cdot \rightarrow C_8H_{18} \quad [24]$$

The temperature T3 is selected in such a way that Butane stays in the gaseous phase while Octane condenses into the liquid phase. This means that T3 is between the temperature interval from the b.p. of the Butane and the b.p of the Octane. For example, if:

The pressure in the BPR is 1 atm., and

We neglect the solubility of Butane in liquid Octane at T3, the temperature interval of T3 will be given by the values quoted in table 10. The table contains also an exemplary temperature value selected

TABLE 10

Exemplary Selection of T3

| Alkane | Boiling Point at 1 atm. [° C.] | Temperature selected as an example |
|---|---|---|
| Butane | 0 | +25 |
| Octane | 126 | |

The filtered-out Hydrogen is brought to the "$H_2$-Inlet-Manifold", (71) that feeds the Electricity Generator (5), EG.

The liquid Octane produced at T3 condenses and sinks to the bottom of the BPR (60). This liquid is considered as NGG. At this point it is translated by the NGG Outlet (64) for distribution or storage.

4.3—Effect of Miscibility in the Second Exemplary Embodiment

The above description of the principle of operation of the Second Exemplary Embodiment, may give the impression that the liquid alkanes transferred from one photoreactor to the next one, are liquids with high purity composition. This impression has been taken for explanation purposes. In reality, as explained in paragraph 3.2.4, the liquid alkanes at the bottom of the photoreactors contain dissolved molecules of the gaseous phase.

Liquid Ethane formed in the MPR (40) contains dissolved Methane. The solution is translated to the EPR (50) where it is heated and gasified. So, the atmosphere of the EPR (50) contains mostly Ethane and small amounts of Methane. The gaseous molecules of Methane can be converted into Methyl radicals by the photolytic reaction [1], or by the reverse reaction of $[3]_R$. The Methyl radicals can form Propane by reactions [10] and [11]:

$$\text{Termination: } C_2H_5 \cdot + CH_3 \cdot \rightarrow C_3H_8 \quad [10]$$

$$\text{Propagation: } C_2H_6 + CH_3 \cdot \rightarrow C_3H_8 + H \cdot \quad [11]$$

Liquid Butane introduced into the BPR (60) contains, beside Propane, dissolved Ethane and even Methane from the EPR's atmosphere. This solution is translated to the BPR (60) were it is heated and gasified. So, the atmosphere of the BPR contains mostly Butane and small amounts of Propane, Ethane and Methane. The gaseous molecules of Propane, Ethane and Methane can be converted into radicals by: 1) the photolytic general initiation reaction [12], or the propagation reactions with the Butyl radical (relatively abundant in the BPR gaseous phase):

$$CH_4 + C_4H_9 \cdot \rightarrow CH_3 \cdot + C_4H_{10} \quad [25]$$

$$C_2H_6 + C_4H_9 \cdot \rightarrow C_2H_5 \cdot + C_4H_{10} \quad [26]$$

$$C_3H_8 + C_4H_9 \cdot \rightarrow C_3H_8 \cdot + C_4H_{10} \quad [27]$$

The Methyl, Ethyl and Propyl radicals formed in reactions [25], [26] and [27] can react with the relatively abundant Butyl radical to form Pentane, Hexane and Heptane (alkanes are part of the NGG mixture):

$$C_4H_9 \cdot + CH_3 \cdot \rightarrow C_5H_{12} \quad [28]$$

$$C_4H_9 \cdot + C_2H_5 \cdot \rightarrow C_6H_{14} \quad [29]$$

$$C_4H_9 \cdot + C_3H_8 \cdot \rightarrow C_7H_{16} \quad [30]$$

THIRD EXEMPLARY EMBODIMENT 5.1—Description

Another exemplary embodiment is used to process Liquefied Natural Gas, LNG. In this case a modified version of the Second Exemplary Embodiment can be used. Since the NG is liquid when reaching the processing plant, there is no need to compress and cool down the NG. This means that in this embodiment there is no need for two first Major components that are part of the Second Exemplary Embodiment: the Natural Gas Compressor, NGC, and the Joule Thomson Cooler, JT. Instead of the two unnecessary Major components of the Second Exemplary Embodiment, the Photoreactors MPR (40) and EPR (50) include Heat Exchangers that use the low temperature LNG to obtain T1 at the MPR (40) and T2 at the EPR (50).

The cooling fluid from the EPR's Heat Exchanger (54) is NG at T2 that is transferred to the MPR (40) as raw material for the photolytic initiated process of reaction (1).

FIG. 3 is a schematic description of the Third Exemplary Embodiment. The names and numbers identifying the Major Components and the Subcomponents are the same as in the Second Embodiment. Table 11 lists the Sub-Components of each Major Component of the Third Embodiment.

TABLE 11

Major Components and Sub-components of the Third Exemplary Embodiment

| Component Number | Mayor Component | Symbol | Sub-Components Name/Initiaks | Number |
|---|---|---|---|---|
| 40 | Methane Photo-reactor | MPR | M-Inlet (from EPR's Heat Exchanger (54)) | 41 |
| | | | UV-M | 42 |
| | | | SM-M | 43 |
| | | | MPR's Heat Exchanger | 44 |
| | | | LNG Inlet (to MPR's Heat Exchanger) | 45 |
| 50 | Ethane Photo-reactor | EPR | E-Inlet | 51 |
| | | | UV-E | 52 |
| | | | SM-E | 53 |
| | | | EPR's Heat Exchanger | 54 |
| | | | NG at T1-Inlet (to EPR's Heat Exchanger) | 55 |
| 60 | Butane Photo-reactor | BPR | B-Inlet | 61 |
| | | | UV-B | 62 |
| | | | SM-B | 63 |
| | | | NGG-Outlet | 64 |
| 5 | Electricity Generator | EG | H₂-Inlet-Manifold | 71 |
| | | | Ambient-O₂-Inlet | 12 |
| | | | Water-Exhaust | 6 |

5.2—Principle of Operation of the Third Embodiment

The principle of operation of the Third Exemplary Embodiment is similar to principle of operation of the Second Exemplary Embodiment. The operation of the MPR is given in paragraph 4.2.3. The operation of the EPR is given in paragraph 4.2.4. The operation of the BPR is given in paragraph 4.2.5.

In the Second Embodiment NG at RT is used as raw material. In the Third Embodiment NG enters the system as LNG and it also used as a cooling fluid to maintain T1 and T2 before it is introduced to the MPR (40).

FOURTH EXEMPLARY EMBODIMENT

6.1—Description

The description of another exemplary embodiment is given schematically in FIG. 4. Table 12 includes details of the components of this embodiment.

TABLE 12

Components of the Fourth Exemplary Embodiment

| # | Name | Task/Description |
|---|---|---|
| 90 | Slanted Photoreactor | A volume where photoreactions, radical reactions and condensation of alkanes take place. The volume may be a cylinder. The Slanted Photoreactor has an Inclination Angle, $\alpha$, between any horizontal line that intersects the axis of the Photoreactor and the Axis itself. The values of $\alpha$ may be between 0.5 degrees to 89.5 degrees relative the horizon |
| 91 | NG-Inlet | Introduces the NG into the Photoreactor (90). The NG is introduced at the upper part of the Photoreactor (90) at a small distance bellow the Hydrogen Conduit (93). |
| 92 | UV-Sources | To provide UV photons that break the C—H bonds of the Methane (and the other alkanes formed). There are one or more sources, installed in the Photoreactor (90). |
| 93 | Hydrogen Conduit | To extract out the $H_2$ formed in the Photoreactor (90) and to transport the extracted $H_2$ to the Electricity Generator (5). |
| 94 | Product Conduit | To translate the condensed Products at Photoreactor (90) to the Products Reservoir (95). Gives to the NGG thermal isolation from the temperature in the Photoreactor (90) |
| 95 | Product Reservoir | Storage of the Products |
| 96 | Product Outlet | Outlet to storage or delivery to the market. |
| 5 | Electricity Generator, EG | As explained in table 4 |
| 6 | Water Exhaust | As explained in table 4 |
| 12 | Ambient-O₂-Inlet | As explained in table 4 |

7.2—Principle of Operation of the Fourth Exemplary Embodiment

7.2.1—Comparison with the First Exemplary Embodiment

The Principle of Operation of the First and Fourth Exemplary Embodiments are similar. The main difference is the use of Buoyancy to separate Hydrogen from the reaction mixture in the Photoreactor in the Fourth Embodiment, compared to the use of a Hydrogen Selective Membrane used in the First Embodiment.

7.2.2—Buoyancy Separation Enhancement by the Slanted Photoreactor

In paragraph 3.2.3 there is a discussion on gas separation by Buoyancy in a Photoreactor (1) perpendicular to the horizon ($\alpha=90°$). In the Fourth Exemplary Embodiment, the Photoreactor (90) is inclined by an angle $\alpha$, relative to the horizon. This is done in order to increase the separation velocity of the fluids in the photoreactor (90).

In similarity with the Photoreactor (1) of the First Embodiment, at the beginning of the process, the Photoreactor (90) is a column full with a single fluid, gas Methane. During the reactions, when the system reaches a dynamic equilibrium, other alkanes and Hydrogen are formed. Due to the Kinetic (Thermal) Energy, ideally, the gas mixture should be homogenous. But the gases formed in the Slanted Photoreactor (90), will be affected by Buoyancy that will induce a small separation with height of the different molecules in the gas mixture due to their different density. In the gas mixture, the movement and relative position of the molecules is affected not only by Buoyancy, but also by the Thermal Energy and the Viscosity. But Buoyancy will add a force vector that produces a slight separation between the components of the gas mixture.

The inclination of the Slanted Photoreactor (90) will enhance the separation of the fluids in the Photoreactor (90). FIG. 5 is a schematic representation of events induced by the inclination angle α in the Photoreactor (90). FIG. 5 is a side view of a cut of a section the Photoreactor that includes the axis. The thick lines represent part of two the walls, marked as "Upper Wall" and "Lower Wall". Four vertical dashed lines divide the section into three volumes.

In volume (A) we see, schematically, that the radical products of reaction [1] ($CH_4 + hv \rightarrow CH_3 \cdot + H \cdot$) are separated. The Methyl radical has a mass, $m_{CH3}=15$ dalton, while the Hydrogen's mass, $m_H=1$ dalton. Gravitation will push down the Methyl radical, increasing its concentration near the Lower Wall. Buoyancy will push up the Hydrogen radical, increasing its concentration near the Upper Wall.

In volume (B) we see, schematically, that the possibility of reaction [3] ($H \cdot + CH_4 \rightarrow CH_3 \cdot + H_2$) will occur mostly near the Upper Wall, since his region is rich in H. radicals. Again, the lower mass of the $H_2$ molecule, $m_{H2}=2$ dalton, will produce a lift towards the Upper Wall by Buoyancy, while Gravity will push down the Methyl radical towards the Lower Wall. Since the region near the Lower Wall is rich in Methyl radicals, there is an increase in the probability for the radical termination reaction [7] ($2CH_3 \cdot \rightarrow C_2H_6$) that produces Ethane.

In volume (C) we see schematically that the low mass $H_2$ molecule will raise up to the top of the photoreactor, by Buoyancy, passing through a region rich in Hydrogen, near the Upper Wall, thus avoiding collisions with heavier molecules and allowing a faster rise of Hydrogen to the Hydrogen Conduit. Also, the heavier molecules, most probably formed near the Lower Wall, will slide down towards the lower part of the Photoreactor (90), by Gravity, in the region near the "Lower Wall", where collisions with lighter molecules are avoided.

It is evident that photolytic reactions with higher alkanes will have a similar behavior than the Methane radicals formed by reaction [1] described in (A). Thus, the alkyl radical will preferentially move down, while the Hydrogen radical will move up. Also it is clear that the concentration of the alkyl radicals will be higher near the Lower Wall, so that there is an increase in the probability of radical termination reactions.

The overall contributions of Slanted Photoreactor (90) are:

To create areas with local higher concentrations of reactants. This will bring to the acceleration of the reaction kinetics.

To create a region where $H_2$ molecules can be evacuated faster from the system.

To create a region where the Products move faster downstream towards the Products Conduit.

7.2.3—Electricity Production

At the top of the Photoreactor (90) a Hydrogen conduit (93) is installed. It is a tube that extracts out the $H_2$ formed in the Photoreactor (90), and transfers the extracted $H_2$ to the Electricity Generator, EG, (5). Oxygen is also introduced by the Ambient-$O_2$-Inlet (12) to the EG (5)

In the EG (5), the $H_2$ is oxidized with Oxygen to produce electricity and water. The Water Exhaust (6) will expel out the water from the EG, while the electricity will be used to activate the UV sources (92) and other consumers of electrical energy in the system.

7.2.4—Product Extraction

The mixture of condensed alkanes falls through the orifice at the bottom of the Slanted Photoreactor (90) to the Product Conduit (94). This Conduit translates the condensed Product to the Product Reservoir (95). The product is delivered to the marked or stored trough the Product Outlet (96).

The invention claimed is:

1. A method for the conversion of methane included in natural gas into high-energy room temperature liquids, comprising the steps of:
   a) introducing methane, included in natural gas, into a closed volume;
   b) irradiating the methane included in the natural gas by at least one semiconductor UV radiation source, selected from an LED (Light Emitting Diode) or a LASER (Light Amplification by Stimulated Emission of Radiation), wherein said radiation contains photons with a wavelength of 272.5 nm, in order to produce photochemical, radical and molecular collision chemical reactions in order to obtain mixtures of chemical liquid products and chemical gaseous products that include, inter alia, ethane, hydrogen, propane, butane isomers, pentane isomers, hexane isomers, heptane isomers, octane isomers, nonane isomers, and decane isomers;
   c) collecting the hydrogen, that is separated from the mixture by buoyancy, or by a hydrogen selective membrane, or by a centrifugal gas separator, at the upper part of said closed volume wherein the collected hydrogen is then extracted from said closed volume through an outlet dedicated to the extraction of hydrogen;
   d) optionally, using the separated hydrogen to produce electricity that activates at least one electricity consuming load that is used by the method's procedure;
   e) collecting the liquid products, that condense at room temperature (RT), at the bottom of the closed volume;
   f) extracting the collected liquids from said closed volume through an outlet dedicated to the extraction of liquid products;
   g) repeating steps (b) to (f) on the remaining gaseous mixture in said closed volume;
   h) adding methane included in the natural gas so as to maintain constant pressure within said closed volume; and
   i) heating the UV sources, by a heating element, to avoid obscuration of the UV sources by the formation of thin polymer films.

2. The method of claim 1 wherein methane is introduced into the closed volume as room temperature natural gas, or as compressed natural gas, or as liquefied natural gas.

3. The method as described in claim 1 where said closed volume is an inclined volume with an axis inclination angle relative to the horizon of between 0.5 degrees and 89.5 degrees.

4. The method of claim 1, wherein methane included in said natural gas, is photo-dissociated by irradiation with a UV radiation source, selected from a semiconductor LED or a semiconductor LASER, wherein the dissociation products of the photo-dissociation will be methyl and hydrogen radicals, and wherein these radicals will react with other methane molecules and eventually form large alkane molecules and hydrogen molecules.

5. The method as described in claim 1, wherein the formation of waxes is reduced by the continuous extraction of said condensed mixture of liquid products from said closed volume and by maintaining the temperature within said closed volume in an interval of temperatures that reduces the formation of waxes, that is, the boiling point of heptane isomers.

* * * * *